Sept. 22, 1931.  C. F. JOERS ET AL  1,824,050
BRAKE SETTING AND RELEASING APPARATUS
Filed May 4, 1929  2 Sheets-Sheet 1
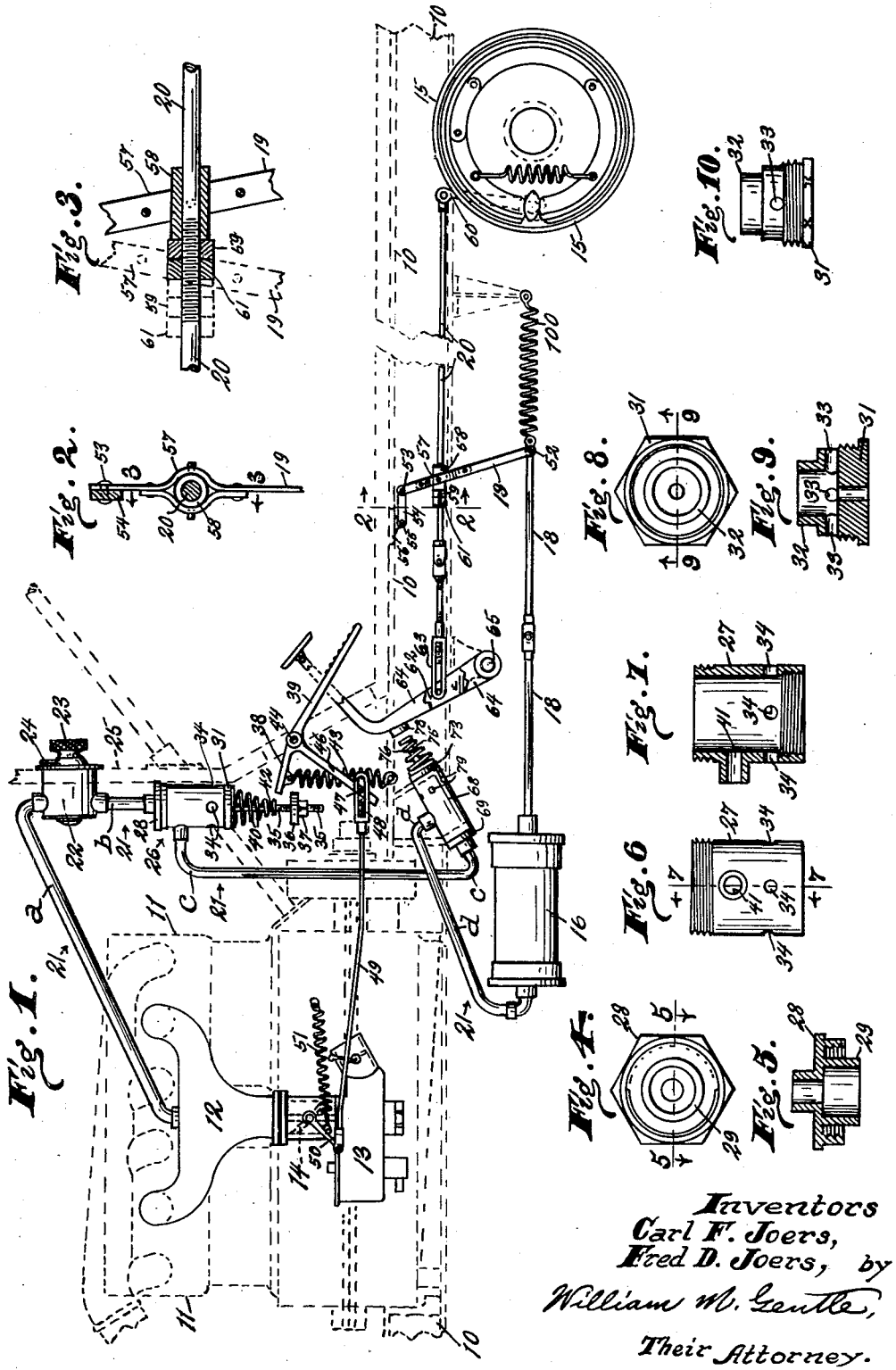
Inventors
Carl F. Joers,
Fred D. Joers, by
William M. Gentle
Their Attorney.

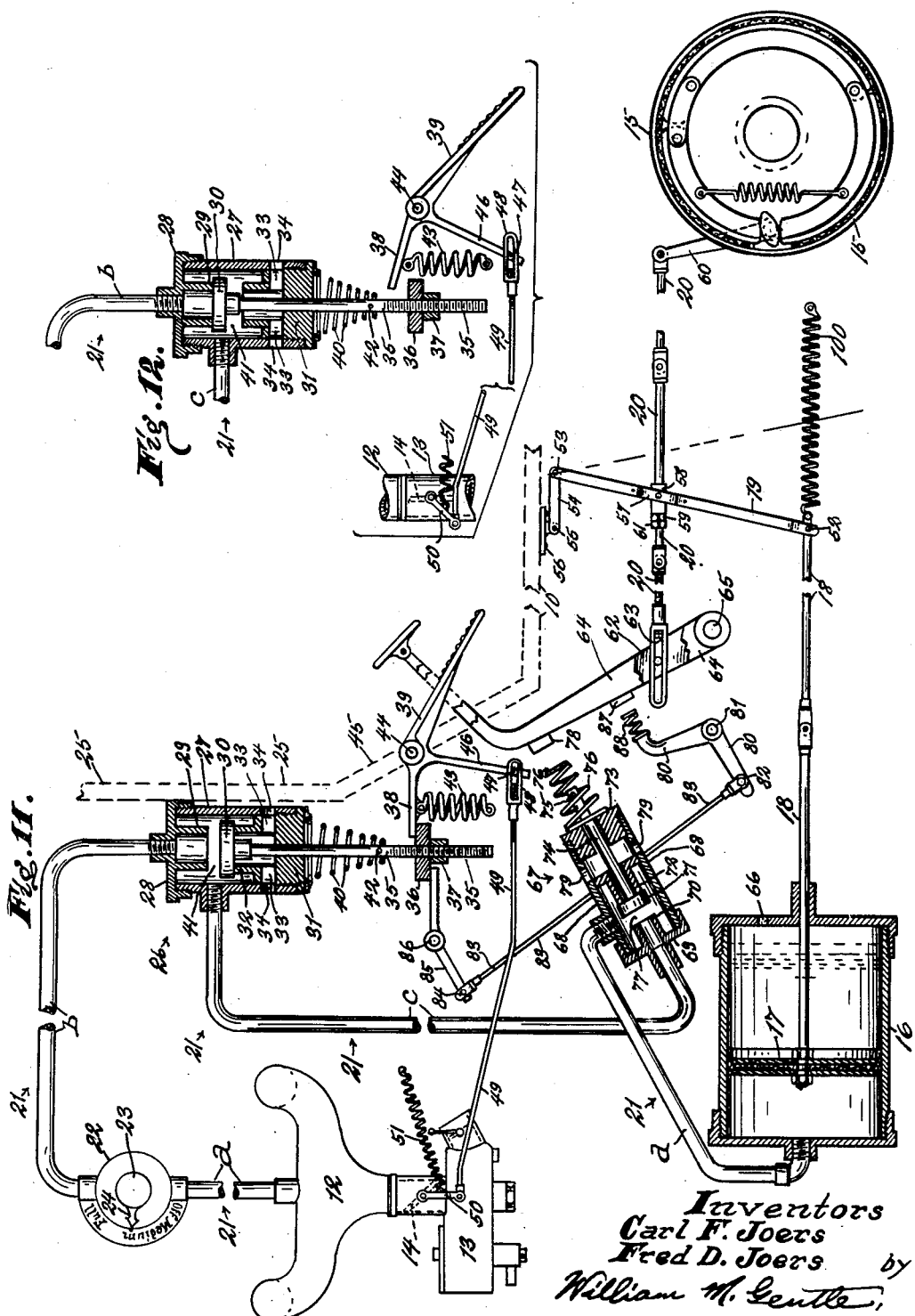

Patented Sept. 22, 1931

1,824,050

UNITED STATES PATENT OFFICE

CARL F. JOERS AND FRED D. JOERS, OF BEVERLY HILLS, CALIFORNIA

BRAKE SETTING AND RELEASING APPARATUS

Application filed May 4, 1929. Serial No. 360,392.

This invention relates to an improvement in a brake setting and releasing apparatus for an automobile, and the principal object thereof is to provide a simple and efficient means for setting and releasing the brakes in a timed relationship to the opening and closing of the throttle valve. That is as the throttle valve is opened the brake setting apparatus will be automatically actuated to release the brakes and vice versa.

Another object of the invention is to so construct and arrange the brake setting and releasing apparatus that it will automatically act to release the brake slightly in advance of the opening of the throttle valve so that the automobile is free to move the instant the throttle valve is open, and also the brakes are automatically set the moment the throttle valve is closed or moved to a position in which the engine is running idle or on very slow speed without a load.

The advantages of such a construction, arrangement and operation of a brake setting and releasing means are obvious especially to drivers acquainted with the difficulties of driving in heavy traffic where there is constant starting and stopping of the automobile, as the brakes are automatically set or released in such traffic in time with the opening and closing of the throttle valve so that the driver is not required to pay any attention to the usual brake mechanism, except in the case of an emergency where it is advisable to use the ordinary brake setting means to assist the automatic means in quickly stopping the automobile.

Another object of the invention is to provide a brake setting and releasing apparatus that can be actuated by the clutch pedal as well as by the throttle pedal to release the brakes when the operator desires to shift the gears.

Features of invention are shown in the construction, combination and arrangement of parts, whereby a brake setting and releasing apparatus is provided that is simple to construct, install and operate, which also is effective and durable in use, and which will greatly simplify the driving and controlling of automobiles in heavy traffic.

Other objects, advantages and features of invention may appear from the accompanying drawings, the subjoined detailed description and the appended claims.

The accompanying drawings illustrate the invention.

Figure 1 is a fragmental semi-diagrammatic side view of a brake setting and releasing apparatus constructed in accordance with our invention, some parts shown in section and others shown somewhat out of proportion to more fully illustrate the invention; also showing the parts of the apparatus in position to set the brakes.

Fig. 2 is a cross section on line 2—2, Fig. 1, showing the arrangement of the sleeve on the brake draw bar and the lever for operating it constructed so the apparatus can operate independently of the usual automobile brakes.

Fig. 3 is a fragmental longitudinal section on line 3—3, Fig. 2, and showing two positions of the lever that connects the apparatus to the brake draw bar.

Fig. 4 is a plan view of one of the end plugs in the slide valve casing.

Fig. 5 is a central section on the line 5—5, Fig. 4, showing a detailed construction of the plug.

Fig. 6 is a side view of the slide valve casing.

Fig. 7 is a central vertical section on line 7—7, Fig. 6.

Fig. 8 is a plan view of the other plug that closes the other end of the slide valve casing.

Fig. 9 is a section on line 9—9, Fig. 8, showing a detail construction of the plug.

Fig. 10 is a perspective view of the plug shown in Figs. 8 and 9.

Fig. 11 is an enlarged fragmental sectional view of the apparatus showing the throttle valve closed and parts in position for setting the automobile brakes, parts omitted and some part .own semi-diagrammatically.

Fig. 12 is a fragmental sectional view through the slide valve and associated parts showing their position when the throttle valve is open and suction through the valve is interrupted; also showing the passage to the outer air open to relieve suction on the piston so that the brakes can be released.

This improvement in brake setting and releasing means can be connected to any ordinary automobile having such parts as a frame 10, engine 11, inlet manifold 12, carbureter 13, throttle valve 14 and brakes 15; and in the invention such old parts are shown semi-diagrammatically for the purpose of illustration.

The invention includes a cylinder 16 having a piston 17 that is connected by a piston rod 18 with one end of a lever 19 that is mounted and arranged to actuate the usual brake draw bar 20. The detailed construction, arrangement and operation of these parts will be explained later.

The invention also includes a pipe connection 21 between the inlet manifold 12 and the cylinder 16, whereby suction from the engine actuates the piston to set the brakes. This pipe connection includes the pipe sections $a$, $b$, $c$ and $d$.

Interposed in the pipe connection 21 is a control valve 22 that is adapted to regulate or control the suction on the piston. It is provided with a knurled knob 23 and pointer 24 for indicating whether the suction is "off", "medium", or "full". The detailed construction of this valve is not shown as it is old in the art. It can be secured to the automobile dashboard 25 as indicated in Fig. 1, or to any other suitable place where it is convenient for the driver to reach it.

Also interposed in the pipe line 21 between the sections $b$ and $c$ is a slide valve 26 that operates in a timed relationship to the opening and closing of the throttle valve 14 to automatically interrupt the suction on the piston 17 so that the brake can be released when the throttle valve is opened and vice versa.

This valve includes a cylindrical casing 27 that has one end closed by a plug 28 to which one end of the pipe section $b$ is connected, and this plug is provided with a cylindrical extension 29, the free end of which forms a valve seat that is adapted to be engaged by the slide valve head 30 when suction is to be interrupted on the piston 17 so that the brakes can be released.

The other end of the casing 27 is closed by a plug 31 that has an inward cylindrical extension 32 that terminates in a valve seat through which there is a passage from the outer air to the pipe 21, and the head 30 is held engaged with this seat to close the air passage when the throttle valve is closed.

The plug 31 is provided with passages 33 that register with similar passages 34 through the casing 27, through which outside air can pass to the pipe section $c$ to release suction on the piston when the throttle valve is open.

The head 30 is connected to a stem 35 that extends down through the plug 31, and this stem has its lower end threaded for the adjustable nuts 36 and 37. The lower nut 37 is arranged to hold the nut 36 in position to be properly engaged by an arm 38 on the throttle valve pedal 39 so as to be normally held down against the tension of the spring 40, so as to seat the head 30 on extension 32 and thereby hold the passage 41 open to suction to set the brakes 15.

The spring 40 has its upper end secured to the plug 31 and its lower end is secured over a pin 42, and normally this spring forces the head 30 toward the seat 29. In other words when the arm 38 is moved to release the nut 36 the spring 40 acts to automatically engage the head 30 with the seat 29 to interrupt suction on the piston 17.

Normally, however, the head 30 is held seated on the extension or seat 32 by a strong spring 43 that has one end connected to the arm 38 and the other end attached to the automobile frame 10.

The throttle pedal 39 is pivotally connected by a pin 44 to the foot-board 45, and it has another arm 46 pivotally connected by a pin 47 to a slotted clevis 48. The clevis is connected by a rod 49 to a throttle lever 50 that is arranged to open the throttle valve 14.

The throttle valve 14 is closed by a spring 51 that has one end connected to the lever 50 and the other end is attached to the engine 11. The foregoing parts are arranged so that when the head 30 is engaged with the seat 32 the throttle valve will be fully closed, or in a position to operate the engine on low speed and without a load, and vice versa.

The clevis 48 is slotted so that the pedal 39 can move the arm 38 to release the nut 36 before the arm 46 has moved far enough in the slotted clevis 48 to move the rod 49, the purpose of which is to seat the head 30 on the seat 29 and interrupt suction on the piston 17 so that the brakes can be released slightly in advance of the opening of the throttle valve.

With the parts constructed and arranged as described, suction will be applied to the piston 17 to automatically set the brakes 15 when the throttle valve is closed, and outside air will be admitted to the pipe connection 21 when the slide valve is opened, so that the brakes can be automatically released by the spring 100.

The piston 17, as previously stated, is connected to the usual brake draw bar 20, and this connection consists of the bar 18 and lever 19.

The lever 19 has its lower end pivotally connected by a pin 52 to the piston rod 18, and its upper end is connected by a pin 53 to one end of a link 54 fulcrumed on a pin 55 in a bracket 56 that is secured to the frame 10.

The center portion of the lever 19 is in the form of a yoke 57 that is pivotally connected to a sleeve 58 that is slidably mounted on the draw-bar 20; and it is arranged so that when actuated by the lever 19 toward the engine 11 it will engage the nut 59 and draw the brake lever 60 forward to set the brakes, as indicated by dotted lines in Fig. 3.

The nut 59 is adjustable on the draw bar 20, and it is held in adjusted position by a similar nut 61.

The sleeve 58 is loosely mounted on the draw bar 20 so that the brake pedals 62 can be moved to set the brakes independently of the lever 19; also the draw bar 20 is connected to the brake pedals 62 by a slotted clevis 63 so that the lever 19 can set the brakes without actuating the brake pedal. It is obvious that both the lever and pedals can be actuated simultaneously to set the brakes, which joint action is desirable in case of an emergency.

The brake pedal 62 and also the clutch pedal 64 are mounted on a cross rod 65 in the usual way.

The cylinder 16 is provided with a port 66 so that air can enter or pass out of the cylinder as the piston is moved to set or release the brakes.

Interposed in the pipe line 21 is another slide valve 67 that is similar in construction to the slide valve 26. It includes a casing 68 having a plug 69 in one end that has a cylindrical extension 70 that forms a valve seat for the valve 71 that is normally seated on the end of a cylindrical extension 72 on the plug 73 that closes the other end of the casing 68.

A valve stem 74 is connected to the head 71 and extends through the plug 73, and interposed between the plug 73 and a pin 75 in the stem 74 is a spring 76 that normally holds the head 71 engaged with the valve seat of extension 72 so that the passage 77 between the pipe sections c and d is open. The spring 76 is extended beyond the pin 75 so that when engaged by the hammer 78 on the clutch pedal 64 there will be no excessive shock to the parts in shifting the head 71 from one valve seat to the other.

The casing 68 is provided with air inlet passages 79 through which air passes to the cylinder 16 to release the brakes when the clutch lever is actuated so as to engage the hammer 78 with the stem 74 to shift the head 71 from the extension 72 to the extension 70.

In other words, when the clutch pedal is actuated it interrupts suction on the piston 17 so that the brakes can be released by a spring 100 that has one end connected to the draw bar 18 and the other end to the frame 10. The purpose of interrupting suction on the piston 17 by means of the clutch pedal is to enable an operator to easily shift the gears when necessary.

The clutch pedal 64 can also be used to operate the valve 26 by means of a bell crank 80, push bar 83 and another bell crank lever 85 arranged to raise the head 30 and interrupt action through the pipe 21, as shown in Fig. 11. In other words we provide a bell crank 80 that is pivotally mounted on a pin 81 that can be connected to the frame in any well known way, and one arm of this crank is pivotally connected by a pin 82 to a push bar 83 that has its other end connected by a pin 84 to one end of a bell crank lever 85 fulcrumed at 86.

The other end of the lever 85 is arranged to engage the underside of the nut 36 and lift it to intercept suction through the pipe 21 when the bell crank 80 is actuated by the clutch pedal 64.

This pedal is provided with a hammer head 87 that is arranged to engage a shock spring 88 secured on one end of the bell crank 80. When the clutch pedal actuates the bell crank 80 the nut 36 will be lifted to shift the valve head 30 from the seat 32 to the seat 29 so that suction through the pipe 21 will be interrupted and air will pass through the ports and passages 33 and 34 to the cylinder 16 to release the piston from suction so that the spring 100 can release the brakes 15 as previously stated.

In operation the parts of the apparatus are arranged so that when the throttle valve 14 is normally closed, or in the usual position in which the engine is operating on low speed without a load, the throttle valve pedal will hold the head 30 engaged with the valve seat 32 with the suction passage 41 open so that suction through the pipe 21 will set the brakes 15.

The control valve 22 can be adjusted to give the required suction through the pipe 21 to properly set the brakes under ordinary automatic driving conditions, it being understood that this apparatus does not interfere with the usual braking apparatus of the automobile which can be used in an emergency to aid the automatic means in setting the brakes.

When the pedal 39 is first actuated toward opening the throttle valve it will release the nut 36 so that the spring 40 will automatically shift the valve head 30 to close the passage 41 to suction and open the passage to the outer air so that the spring 100 can release the brakes 15 slightly in advance of the opening of the throttle valve so that the automobile is free to move when the engine picks up the load.

When the gears are to be shifted to change the speed of the automobile the clutch pedal will actuate the valve 68 to interrupt suction on the brakes to thereby aid in properly shifting the gears; or if desired the clutch pedal can be arranged to operate the valve 26, as previously stated, to interrupt the suction through the pipe 21.

In attaching this automatic brake setting and releasing apparatus to the automobile, the usual brake apparatus for setting and releasing the brakes is not disturbed or displaced, but is left free to operate independently of the automatic means or the two braking means can be operated together as stated.

We claim as our invention:

1. In a brake setting and releasing apparatus for an automobile the combination with a brake of a piston connected to said brake, a cylinder in which said piston is mounted, a pipe connection between said cylinder and the inlet manifold of an internal combustion engine, whereby suction is applied to said piston to set said brake when the engine is operating and the throttle valve is closed, means adapted to be actuated by the clutch pedal for interrupting suction through said pipe connection so that the brake can be released, and means for releasing said brake when suction through said pipe connection is interrupted.

2. In a brake setting and releasing apparatus for an automobile the combination with a brake of a piston connected to said brake, a cylinder in which said piston is mounted, a pipe connection between said cylinder and the inlet manifold of an internal combustion engine, whereby suction is applied to said piston to set said brake when the engine is operating and the throttle valve is closed, means adapted to be released by the throttle valve pedal for automatically interrupting suction through said pipe connection so that said brake can be released, other means in said pipe connection that is adapted to be actuated by the clutch pedal for interrupting suction through said pipe connection, and a spring for releasing said brake when suction on said piston is interrupted by either the throttle valve pedal or the clutch pedal.

3. In a brake setting and releasing apparatus the combination with a brake, of a cylinder, a piston therein that is connected to said brake, a pipe connecting said cylinder with the inlet manifold of an engine, a throttle valve for controlling the inlet to said manifold, a pedal for actuating said throttle valve, a valve casing in said pipe connection, plugs closing the ends of said casing, extensions to said plugs that have valve seats therein, a slide valve interposed between said extensions that normally closes a passage to the outer air when the throttle valve is closed so that suction from the manifold through said pipe connection will move said piston and set said brake, a stem to said slide valve, a light spring for automatically moving said slide valve to interrupt suction on said piston and admit outer air to said pipe connection when the throttle lever is actuated to open said throttle valve, and a heavy spring on said throttle lever for moving said slide valve against the tension of said light spring to close the passage to the outer air and again open suction through said pipe connection when said throttle lever is released and the throttle valve closed.

4. The combination set forth in claim 3, and means whereby said slide valve can be moved by the clutch pedal against the tension of the throttle lever spring to interrupt suction in said pipe connection.

In testimony whereof we affix our signatures.

CARL F. JOERS.
FRED D. JOERS.